June 6, 1933.  J. C. VAN BERKEL  1,913,013
SLICING MACHINE
Filed Oct. 26, 1928  2 Sheets-Sheet 1
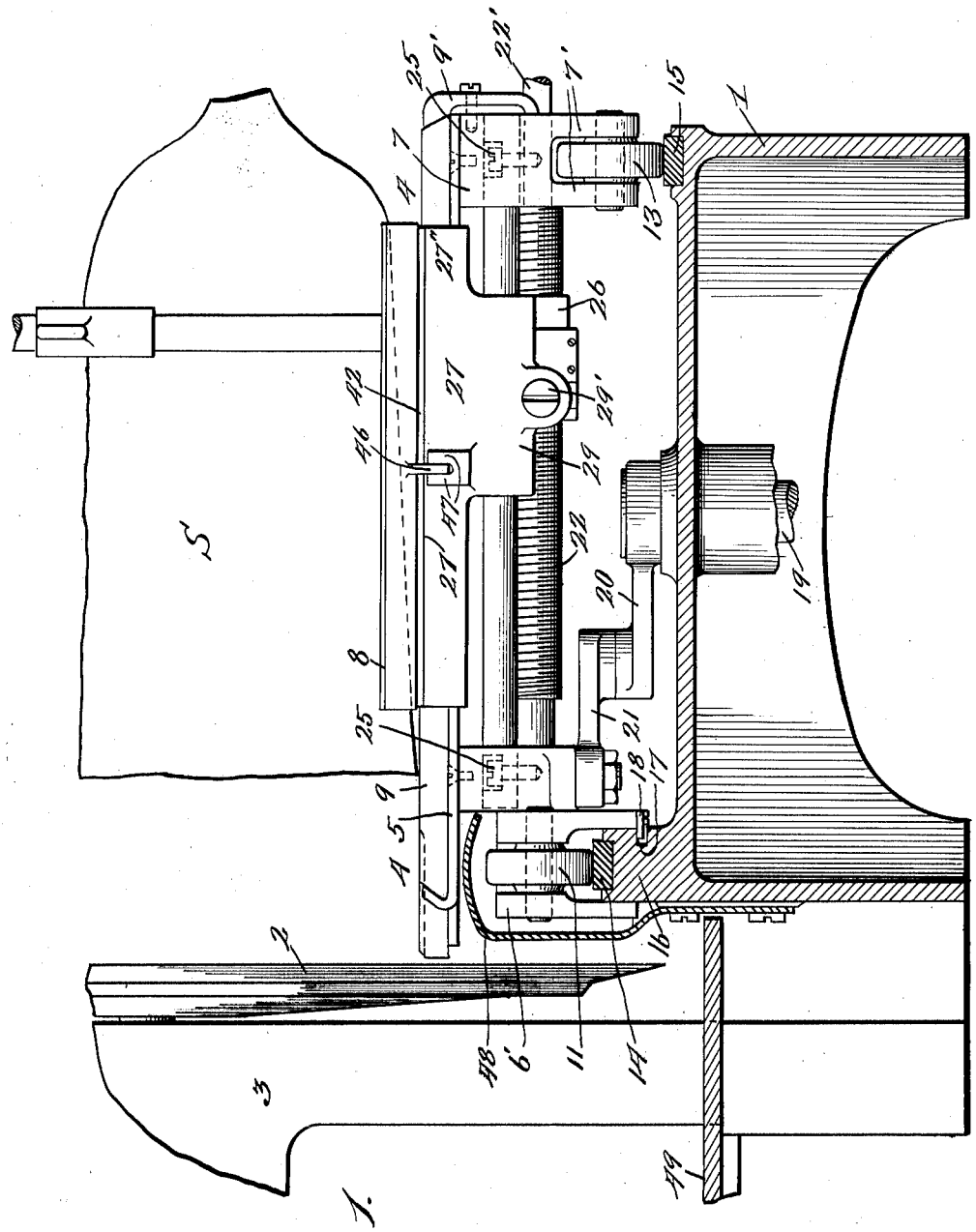

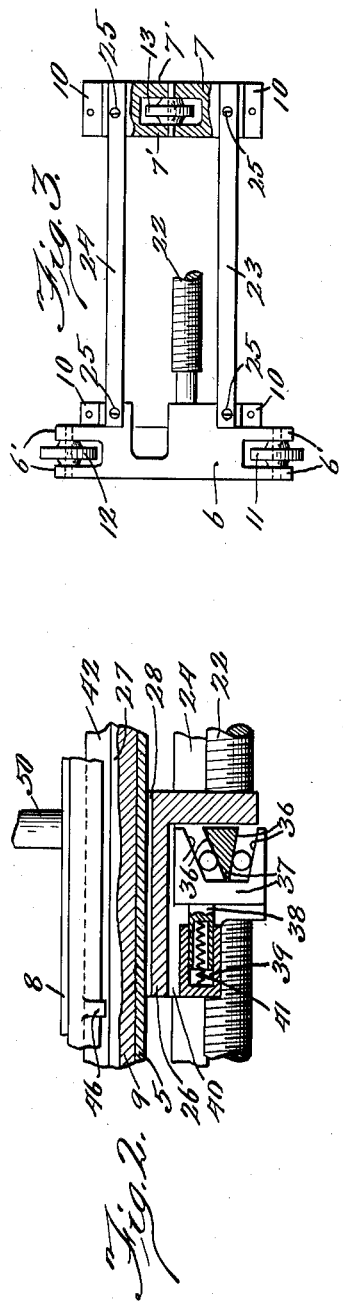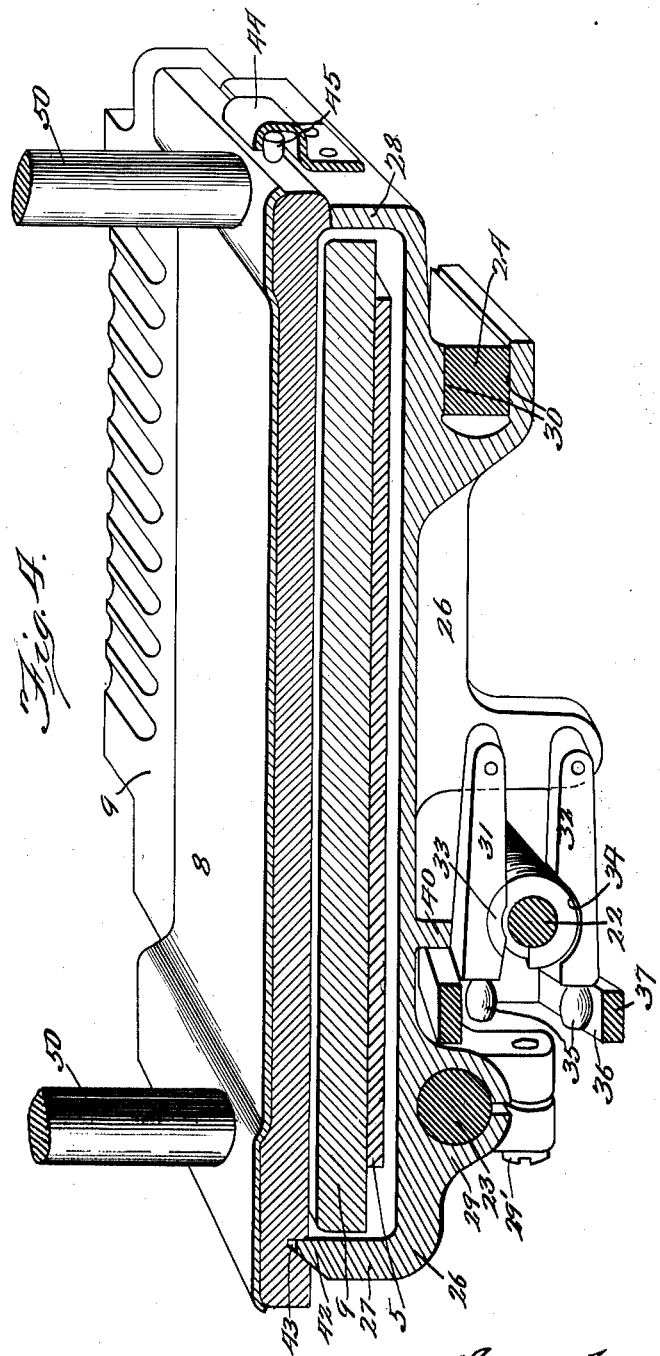

Patented June 6, 1933

1,913,013

UNITED STATES PATENT OFFICE

JOHANNES C. van BERKEL, OF COPENHAGEN, DENMARK, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

SLICING MACHINE

Application filed October 26, 1928, Serial No. 315,334, and in Great Britain December 2, 1927.

This invention relates to slicing machines of the kind comprising a slicing knife and a table adapted to support the substance to be sliced, the arrangement being such that, in the operation of the machine, the substance is moved recurrently past the knife or, alternatively, the knife is moved recurrently past the substance, so that slices may be cut from it in succession.

The substance-supporting table includes certain members on which the substance directly rests, one of these members being a plate (usually made or faced with some material which will not taint the substance and hereinafter referred to as a "meat plate" simply to distinguish it) secured rigidly to the table and another of them being a movable feed plate superposed upon the meat plate. In the operation of the machine, the substance to be sliced is clamped to the feed plate, and the latter is fed step-by-step across the carriage towards the slicing knife, the forward end of the substance overhanging the feed plate and sliding across the upper surface of the meat plate. The feed plate's movement is transmitted to it by a feed screw and some form of feed nut (e. g. a saddle nut or nut segment) co-acting with the feed screw.

The feeding mechanism disclosed in this application is claimed in my co-pending application, Serial No. 315,332, filed October 26, 1928.

One of the foremost aims in connection with slicing machines in general is to render them thoroughly hygienic. The present invention has this aim in view, its object being to improve the construction of machines of the kind referred to, whereby certain of the working parts, heretofore exposed, will be shielded against particles of meat and the like which otherwise would tend to accumulate on such working parts and in time putrefy.

In accordance with the invention, a machine of the kind referred to is so constructed that the feed plate is guided across the table by one or more guides (exclusive of the feed screw) located beneath and shielded by the meat plate, or equivalent, for the purpose of preventing particles of the substance being sliced being deposited upon the said guides. For the same purpose the feed screw and feed nut may also be located beneath the meat plate or equivalent.

In order that the invention may be clearly understood, one embodiment thereof, chosen as an illustrative example, will now be described with reference to the accompanying drawings, in which—

Fig. 1 is a fragmentary end view of a slicing machine, of whch certain parts have been shown in section;

Fig. 2 is a fragmentary detail sectional view;

Fig. 3 is a plan, partly in section and drawn to a small scale, of parts of the machine hereinafter referred to; and Fig. 4 is a diagrammatic sectional view showing certain parts of the slicing machine in perspective.

In the drawings, the numeral 1 denotes the stationary base of the machine, 2 denotes the slicing knife, which is journaled to rotate in a stationary bracket 3, and 4 denotes generally the table consisting of a carriage, for supporting the substance S.

As shown, the carriage 4 comprises a frame 5, 6, 7, a feed plate 8, and a meat plate 9. The frame is constituted by a plate 5 and two brackets or end members 6 and 7, the plate being screwed to co-planar facings 10 on the brackets and the meat plate 9 being clamped to the plate 5 by a clamp 9'. The carriage is borne by rollers 11, 12 and 13 riding on tracks 14 and 15. The rollers 11 and 12 are both journaled between jaws 6' on the bracket 6, which acts also as a guide for the carriage, the jaws 6' being for this purpose adapted to engage the sides of a ridge 16 extending along one side of the base and supporting the track 14 on which the rollers 11 and 12 ride. A groove 17 is formed along one side of the ridge 16 and is entered by a retaining plate 18 on one of the jaws 6'. The roller 13 is journaled between jaws 7' on the bracket 7 and rides on the track 15.

The slicing machine shown is of the well-known reciprocatory carriage type. The mechanism for reciprocating the carriage comprises a rotatable crank shaft 19, a crank 20 thereon and a connecting rod 21 linking the crank to the bracket 6. The means for rotating the knife 3 and the crank shaft 19 has not been shown, but is well known in the art.

The numeral 22 denotes the feed screw of the machine. As shown, the feed screw is journaled in the brackets 6, 7 and extends between them. Two bars 23 and 24 also extend between the brackets 6, 7, the bars being parallel to, and on opposite sides of, the feed screw and being rigidly secured to the brackets by screws 25. A horizontal member 26 with upturned ends 27 and 28 extends beneath the carriage, the upturned ends 27 and 28 uprising in front of and behind the carriage, respectively. The member 26 has a part 29 clamped around, and a sliding fit on, the bar 23, which is round, the tightness of the clamp 29 being regulatable by a screw 29'. The member 26 is recessed at 30 to be a sliding fit on the bar 24, which is of rectangular section in the construction shown. In addition, a pair of levers 31, 32 are pivoted on the member 26. The lever 31 is provided with a nut segment 33, constituting the feed nut, which is adapted to mesh with the screw thread of the feed screw, and the lever 32 has a recess 34 adapted simply to bear on the outer surface of the said screw threads. The levers carry rollers 35 engageable with inclined channels 36 in a slidable cam member 37. A tubular stem 38 on the cam member 37 is a sliding fit within a socket 39 on a transverse web 40 integral with the member 26. A spring 41 acts on the stem 38 and normally forces the parts 33, 34 into the requisite engagement with the feed screw. The upturned end 27 is extended at 27', 27'' to the full width of the feed table 8, and is wedge-shaped along its upper side, the wedge being indicated by the numeral 42 (see especially Fig. 4). The wedge 42 is adapted to fit into a conformably shaped groove 43 in the under side of the feed table. The feed table simply rests, at the far side, upon the upturned end 28. At this side, a U-shaped bracket 44 on the feed table is adapted to slide over a pin 45 on the upturned end 28 when the feed table is fitted on the machine, this bracket 44 serving to restrain the far side of the feed table against tilting. A lug 46 on the near side of the feed table fits between two lugs 47 on the upturned end 27, thereby insuring that the feed table will maintain its correct relationship to the member 26.

In the operation of the machine, the feed screw 22, at its ends 22', receives intermittent rotational movements by automatic mechanism (not shown, but well known in the art). As a result, the nut segment 33 will advance step-by-step along the feed screw and will entrain the member 26 and the feed plate 8, which latter will advance across the carriage towards the knife.

The numeral 48 denotes a shield forming no part of the present invention. The shield 48 extends throughout the length of the machine and prevents particles of meat and such like falling on the track 14 and also prevents oil from the working parts of the machine being deposited on the slides as they pass from the carriage 4 to the usual slice receiving plate 49 and as they lie on this plate.

The numeral 50 denotes the usual clamp device for clamping the substance S to the feed plate 8.

Means would be provided for moving the cam member 37 against the force of the spring 41 so as to force the parts 33, 34 to move clear of the feed screw by the inclined plane action of the walls of the channels 36. When the parts 33, 34 move clear of the feed screw, the feed table 8 may be moved manually towards or away from the knife 2.

By tilting the feed table 8 at the near side until the lug 46 is freed from the lugs 47, it may be slid away from the knife 4 until the U-shaped bracket is freed from the pin 45. Thereafter the feed table may be lifted away from the machine.

In a machine having its carriage and parts associated therewith constructed as herein described and illustrated, the guide elements 23, 29 and 24, 30, and also the feed screw 22 are shielded by the meat plate 9, so that particles of meat and such like cannot fall on them. It will be obvious that the co-operating guide elements 24, 30 might be dispensed with and the member 26 simply supported at the far side of the machine.

It is to be understood that the construction shown may be varied without departing from the scope of the invention which, moreover, may be applied to machines other than those of the reciprocatory carriage type, for instance, machines with oscillatory or rotary carriages, and also to machines in which the substance is supported on a stationary table and the knife is reciprocated past it.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. A slicing machine comprising a reciprocating under table, a feed table movable transversely thereto and above said under table, a guide beneath said under table extending in a direction parallel to the direction in which said feed table moves, a member guided by said guide and extending into a position to engage a portion of said feed table, and inter-connecting means between said feed table and said member comprising a rigid projection on said table, a rigid element on said member overlying said rigid projection on said feed table to prevent upward movement of said table, and means to prevent longitudinal movement of said member relative to said feed table comprising a plurality of interengaging lugs abutting each other and arranged in series on said member and table in the direction in which said feed table moves.

2. A slicing machine comprising a reciprocating under table, a feed table movable transversely thereto, a guide extending in direction parallel to the direction in which said feed table moves, a member guided by said guide and extending into a position to engage a portion of said feed table, and interconnecting means between said feed table and said member comprising a rigid member on said member adapted to overlie and engage a rigid projection on said table to prevent movement of said feed table upward away from said member and means to prevent longitudinal movement of said feed table relative to said member comprising rigid abutments on said member and said table, arranged in series in the direction of feed of said feed table interlocking one with the other.

In testimony whereof I have signed my name to this specification on this 17th day of September, A. D. 1928.

JOHANNES C. van BERKEL.